May 31, 1927.
P. S. SINCLAIR
JOINT PACKING
Filed Feb. 24, 1926
1,630,675
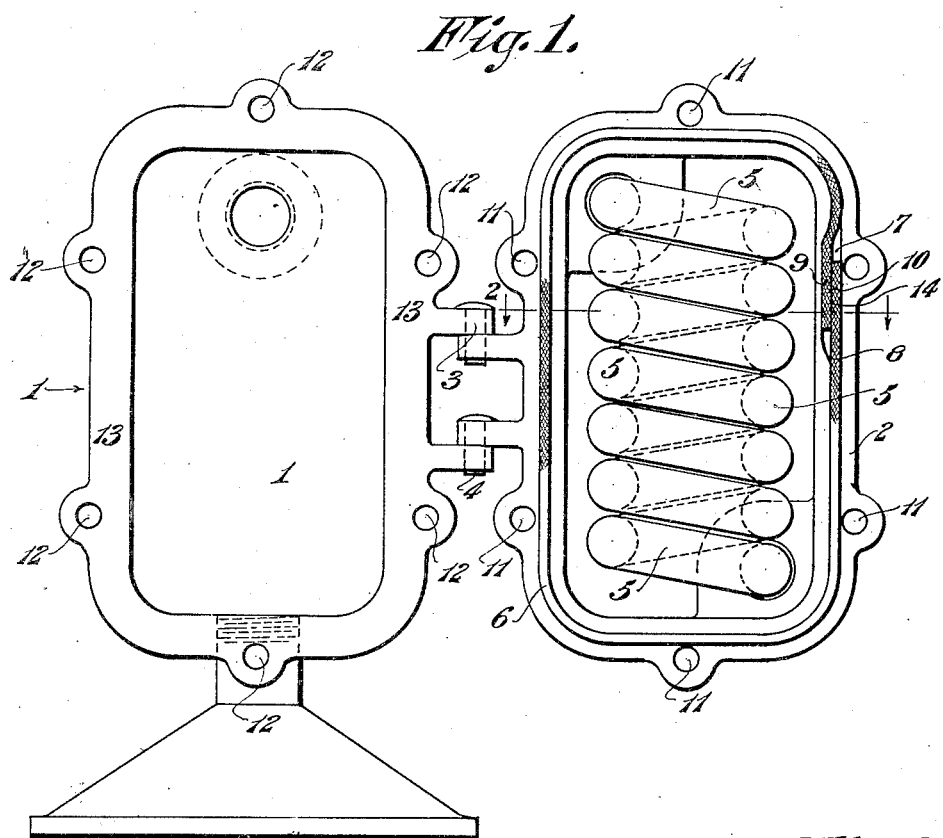
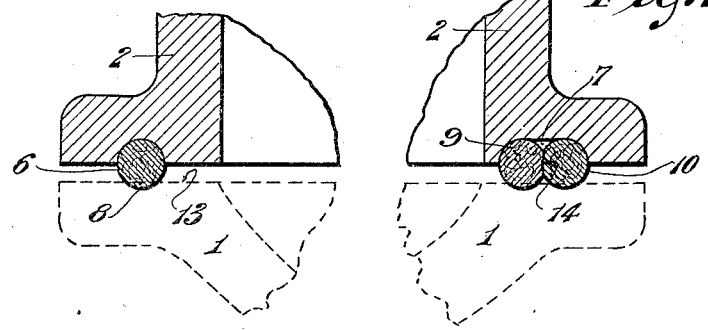
INVENTOR,
Peter S. Sinclair,
BY
Harry W. Bowen.
ATTORNEY.

Patented May 31, 1927.

1,630,675

UNITED STATES PATENT OFFICE.

PETER S. SINCLAIR, OF HOLYOKE, MASSACHUSETTS, ASSIGNOR TO HOLYOKE HEATER COMPANY, OF HOLYOKE, MASSACHUSETTS, A CORPORATION OF MASSACHUSETTS.

JOINT PACKING.

Application filed February 24, 1926. Serial No. 90,349.

This invention relates to improvements in joint packings for water heaters and analogous uses.

An object of the present invention is to provide a packing construction which is designed for use in steam, water, or air apparatus for forming a tight joint, and, one that may be subjected to high pressure, temperatures, etc.

Broadly it comprises a casing member having a door or cover member in which is formed a groove for receiving the packing. A portion of this groove being of double width, whereby the ends of the packing material overlap or pass by each other. The diameter of the packing is preferably twice the depth of the groove so that when the cover or door is closed and rigidly clamped or bolted the packing is subjected to pressure causing the overlapping ends to completely fill the groove part of double width. By overlapping the ends of the packing material there is no danger of the stream of water or air escaping along the line of contact of the overlapping ends. In the case of butt joints there is not enough of the packing to prevent leakage at high pressures. The packing that is preferably employed is some form of rope asbestos which is specially treated.

The present application is a division in part of the application for Letters Patent filed by me August 25, 1925, Ser. No. 52,334 entitled Auxiliary heater. The claims in that application being limited to the manner of attaching the water heating coils to the door of the casing.

Referring to the drawings:

Fig. 1 is an elevational view of the casing and cover plate member with the cover open and illustrating the groove in the inner surface of the door in which the packing is placed and showing the overlapping ends of the packing in that part of the groove which is of double width.

Fig. 2 is a transverse sectional view on the line 2—2 of Fig. 1 on an enlarged scale showing the groove of double width and a portion of the groove of single width in the inner surface of the cover member.

Referring to the drawings in detail:

1 designates the inclosing casing in which the hot water, steam, or air circulates about the water heating coils. 2 designates the door or closure plate member which is pivotally attached to the casing 1 by means of the integral lug construction as indicated at 3 and 4. Secured to the inside of the door 2 are the copper coils 5 through which water flows that is to be heated. It is to be understood that, when the door 2 is closed the interior of the casing is completely filled with hot water, steam, or air. 6 designates a groove or channel in the edge part of the inner surface of the cover 2. This groove is made double width as indicated at 7 as clearly shown in Fig. 2. 8 is an asbestos rope like packing material which is treated with a graphite substance. The ends 9 and 10 of the packing 8 are placed in overlapping, or side by side, positions in the enlarged groove part 7. When the door 2 is closed and suitable securing or clamping bolts are placed in the openings 11 and 12 the packing material 8 then engages the smooth surface 13 which is subjected to a pressure which causes the packing to completely fill the groove. The overlapping ends 9 and 10 of the packing material will completely fill the enlarged groove 7 and assume the positions shown in Fig. 2. This construction effectually prevents any leakage of water, steam, or air. The overlapping ends 9 and 10 will prevent any leakage along the line of contact 14.

The depth of the groove 6 is substantially one-half of the diameter of the asbestos rope packing 8 as shown in Fig. 2.

It will be seen from this description that I have provided a very effective means for making a water, steam, or air tight joint between the casing and the inclosing cover or plate member 2.

What I claim is:

1. A packing joint for a water heating casing comprising a cover member having a groove formed in its inner face, a portion of the groove being of a greater width to receive the ends of the packing material, the length of the groove which is of greater width being such that the ends of the packing material lap or pass by each other in contacting relation and the depth of the groove being less than the thickness of the packing material, means for clamping the cover member to the casing member whereby when the cover member is firmly secured to the casing member which is formed with a smooth or plane surface and against which surface the packing is forced, the portion of the packing material that projects beyond the groove is subjected to pressure and the overlapping ends will completely fill the groove of double width and the line of contact along the overlapping ends will prevent any leakage at that point.

2. A packing construction for water, steam, or air enclosing casings comprising a cover member which is formed with substantially a semi-circular groove, a portion of the groove being of substantially double width, a packing material of a diameter of greater thickness than the groove, the length of the said material being greater than the length of the groove and with only its free ends placed side by side in the part of the groove of double width.

3. Means for forming a tight joint for water, steam, or air under pressure, comprising an enclosing casing having a smooth contact surface, a cover plate for the casing having a contact surface with a semi-circular groove formed therein, a portion of the groove being of greater width, round packing material in the groove, and of a length greater than the length of the groove, the portion of the groove serving to receive the free ends of the packing in side by side relation to permit the ends to lie in the same plane as the rest of the packing, the thickness of the packing material being greater than the depth of the groove, means for clamping the cover plate to the casing whereby the packing material will completely fill the groove and prevent leakage along the contacting side of the free ends.

PETER S. SINCLAIR.